A. J. OLSON.
WAGON BRAKE.
APPLICATION FILED MAR. 21, 1908.
916,769.
Patented Mar. 30, 1909.
2 SHEETS—SHEET 2.
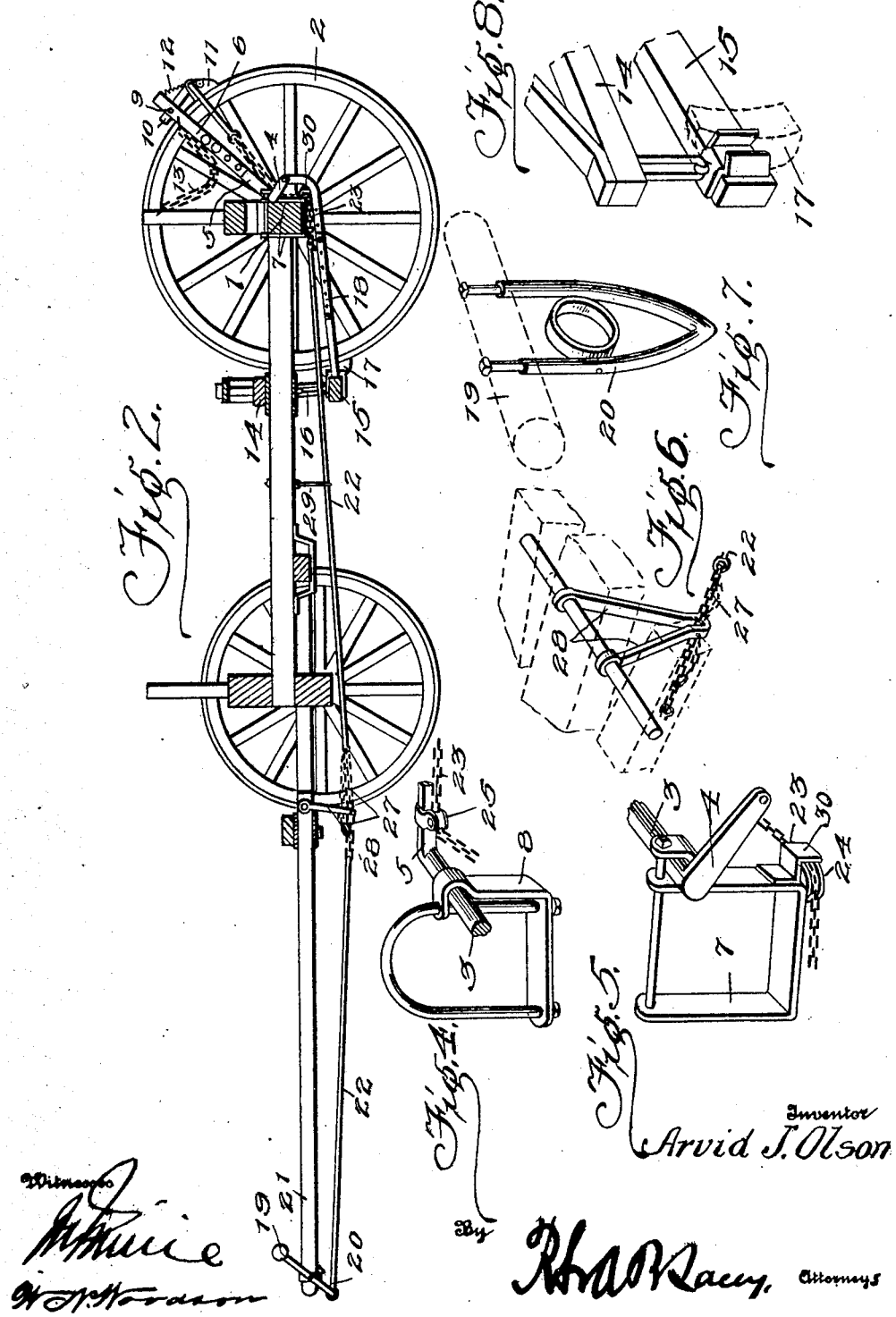
Inventor
Arvid J. Olson

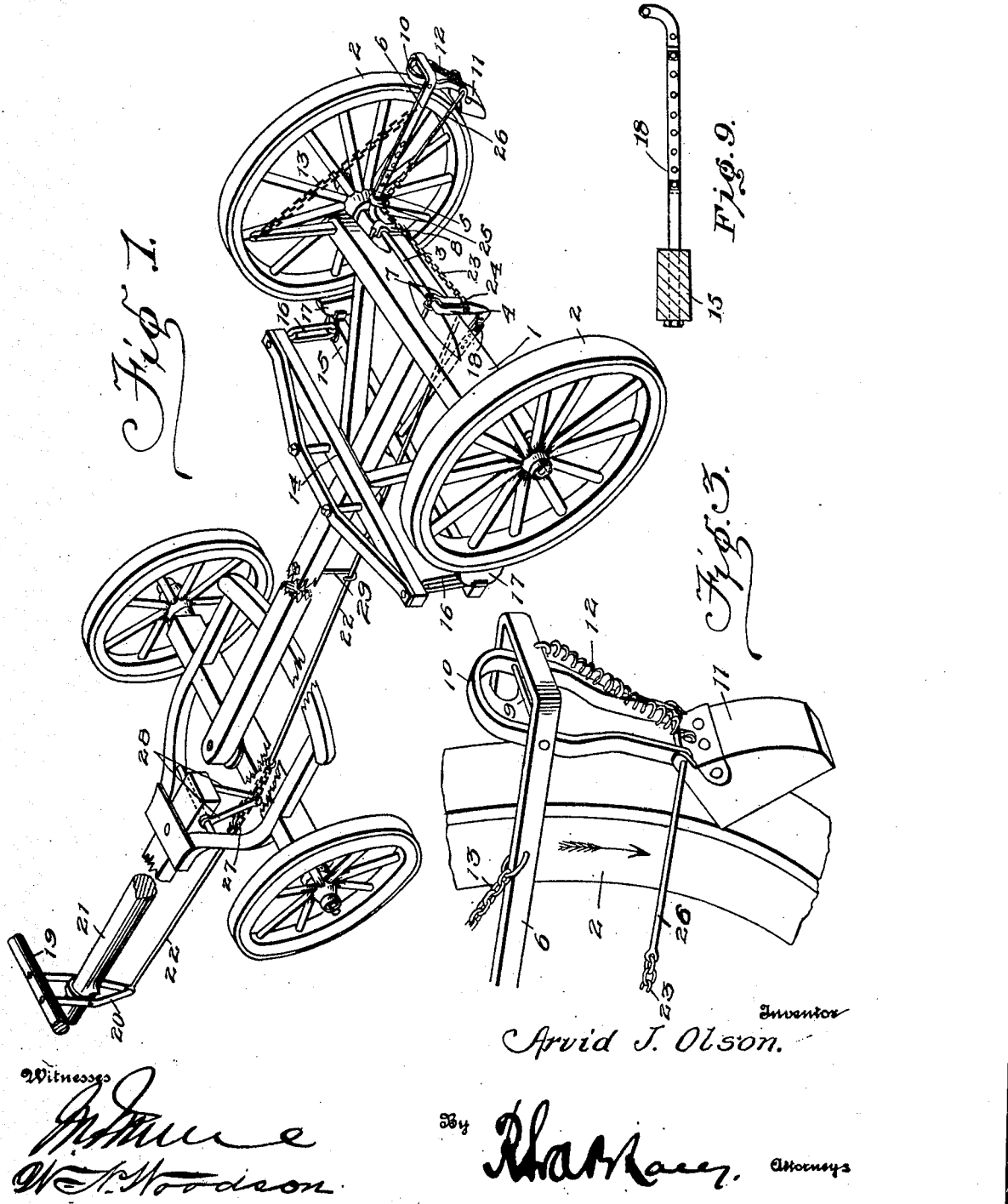

UNITED STATES PATENT OFFICE.

ARVID J. OLSON, OF KLOTEN, NORTH DAKOTA.

WAGON-BRAKE.

No. 916,769.  Specification of Letters Patent.  Patented March 30, 1909.

Application filed March 21, 1908. Serial No. 422,552.

*To all whom it may concern:*

Be it known that I, ARVID J. OLSON, subject of the King of Sweden, residing at Kloten, State of North Dakota, have invented certain new and useful Improvements in Wagon-Brakes, of which the following is a specification.

The present invention relates to improvements in vehicle brakes and has for its object to provide a novel brake mechanism embodying means whereby the same can be readily thrown into and retained in an operative position when it is desired to check the speed of the vehicle.

The invention further contemplates an improved brake which can be readily applied to an ordinary running gear and is automatically controlled by the draft animals.

For a full description of the invention and the merits thereof and also to acquire a knowledge of the details of construction and the means for effecting the result, reference is to be had to the following description and accompanying drawings, in which:

Figure 1 is a perspective view of a vehicle running gear having the improved brake mechanism applied thereto. Fig. 2 is a longitudinal sectional view through the same. Fig. 3 is an enlarged detail view of a portion of one of the rear wheels and the friction shoe coöperating therewith to apply the brake. Figs. 4 and 5 are detail views of the clips applied to the rear axle and upon which the brake actuating crank shaft is mounted. Fig. 6 is a detail view of the hanger which is pendent from the tongue bolt. Fig. 7 is a similar view of the neck yoke lever. Fig. 8 is a detail view of one end of the brake beam and the transverse bar supporting the same. Fig. 9 is a side elevation of the rod which extends forwardly from the brake beam and connects the same to the crank shaft on the rear axle.

Corresponding and like parts are referred to in the following description and indicated in all the views of the drawings by the same reference characters.

Referring to the drawings the numeral 1 designates the rear axle of a vehicle running gear and 2—2 the rear wheels which are mounted upon the axle. Journaled upon the rear side of the axle 1 is a longitudinal shaft 3 provided at its inner end with a crank arm 4 located at approximately the central portion of the axle, and at its outer end with the rearwardly extending arm 5 having the lever 6 adjustably connected thereto. In the present instance it will be observed that this longitudinal shaft 3 is mounted in suitable bearings provided upon clips or brackets 7 and 8 which are detachably applied to the axle. The swinging end of the lever 6 is extended laterally and is provided with a pin 9 having one end of a plate 10 pivotally mounted thereon. Carried by the opposite end of this plate is a shoe 11 designed to frictionally engage the periphery of one of the rear wheels 2, a spring 12 being utilized for throwing the shoe normally into an inoperative position. The lever 6 normally falls downwardly to move the plate and shoe away from the wheel, and the downward swinging movement of the lever is limited by a flexible member or chain 13 connected to a standard projecting upwardly from the rear wagon bolster.

A transverse bar 14 which in the present instance is shown as having a truss formation is secured to the running gear immediately in front of the rear wheels 2, and pendent from this transverse bar is the brake beam 15 which is loosely suspended by means of the hangers 16. Opposite ends of the brake beam are provided with the shoes 17 which may be of any approved form and are designed to engage the forward portions of the rear wheels in the usual manner. Extending rearwardly from an intermediate portion of the brake beam 15 is a rod 18 having the extremity thereof extended upwardly and pivotally connected to the crank arm 4 at the inner end of the shaft 3. With this construction it will be obvious that when the shoe 11 is moved inwardly against the action of the spring 12 and caused to frictionally engage the rear wheel the lever 6 will be swung upwardly as the rear wheel revolves and this movement of the lever will operate through the crank arm 4 to produce tension in the rod 18 and draw the brake shoes 17 against the forward portions of the wheels. In this connection it may be mentioned that both the rod 18 and the lever 6 are extensible to admit of the brake mechanism being properly adjusted for various wagons and different sizes of wheels.

It is contemplated to place the brake under the control of the draft animals and for this purpose the neck yoke 19 is provided with a lever 20 which is pivotally connected at an intermediate point in its length to the forward portion of the tongue 21. The lower extremity of the lever 20 which projects below the vehicle tongue and is connected to a tie member 22 terminating at its rear end in a chain or cable 23 passing around the guide pulleys 24 and 25 upon the rear axle and having the extremity thereof connected to a rod 26 projecting from the shoe 11. Chains 27 which are adjustably connected to each other are interposed in the length of the tie member 22 and are engaged by a hanger 28 which is pendent from the tongue bolt. When the vehicle is going down hill and the draft animals draw back upon the neck yoke 19 the lower end of the neck yoke lever 20 is moved forwardly and tension is produced in the tie member 22. This tension causes a pull to be exerted upon the cable 23 and the shoe 11 is thereby drawn into frictional engagement with the rear wheel 2. This action of the shoe causes the lever 6 to be swung upwardly as the wheel continues to revolve and as previously described the brake shoes 17 carried by the brake beam are thereby moved into engagement with the forward portions of the wheel. As soon as the team ceases to draw back upon the neck yoke tension in the tie member 22 is removed and the spring 12 operates to draw the shoe 11 away from the wheel, whereupon the shoe and lever 6 drop downwardly into an inoperative position and release the brake shoes 17. Should it be desirable to stop and rest the team while going up hill the driver can readily step to the rear wheel and raise the brake lever 6, thereby applying the brake and holding the wagon with very little effort. If preferable however this same result could be accomplished by attaching a chain or rope to the lever 6 and bringing the same up to one side of the seat.

When the vehicle is backed the friction shoe 11 is caused to engage the wheel, but as indicated in Fig. 3 the direction of rotation of the wheel tends to swing the lever 6 downward as far as is permitted by the chain 13 and does not apply the brake shoes 17. If found desirable a hanger or hook 29 may be applied to the reach for supporting the tension member 22, and a guard 30 is shown as secured to the bracket 7 and extending over the pulley 24 to shield the same.

Having thus described the invention, what is claimed as new is:

1. In a wagon brake, the combination of a shaft journaled on the axle, a brake, connecting means between the brake and the shaft, a lever rigid with the shaft, and means carried by the lever for engaging the periphery of the wheel for throwing the brake into operative position.

2. In a wagon brake, the combination of a shaft journaled on the axle, a brake, connecting means between the brake and the shaft, a lever rigid with the shaft, a shoe carried by the lever for engaging the periphery of the wheel for moving the brake into an operative position, and means for holding the shoe normally out of engagement with the wheel.

3. In a wagon brake, the combination of a shaft journaled upon the axle, a brake, connecting means between the shaft and the brake, a lever rigid with the shaft, a shoe mounted upon the lever and adapted to engage the periphery of the wheel for swinging the lever to actuate the brake, means for normally holding the shoe out of engagement with the periphery of the wheel, and means controlled by the draft for moving the shoe into engagement with the wheel.

4. In a wagon brake, the combination of a shaft journaled upon the axle, a brake, connecting means between the brake and the shaft, a lever rigid with the shaft for turning the same, a plate loosely mounted upon the lever, a shoe pivotally mounted upon the plate and adapted to frictionally engage the periphery of the wheel to swing the lever and rotate the shaft for actuating the brake, means for normally holding the shoe out of engagement with the wheel, and means for forcing the shoe to engage the wheel when it is desired to actuate the brake.

5. In a wagon brake, the combination of a crank shaft journaled upon the axle, a brake beam, shoes carried by the brake beam for engaging the wheel, a rod connecting the brake beam and the crank portion of the shaft, a lever rigid with the shaft, a shoe carried by the lever for frictionally engaging the periphery of the wheel to swing the lever and actuate the brake, and means for normally holding the said shoe upon the lever in an inoperative position.

In testimony whereof I affix my signature in presence of two witnesses.

ARVID J. OLSON. [L. S.]

Witnesses:
H. NORSKOG,
OTTO A. OLSON.